United States Patent [19]

Astero

[11] 4,343,538
[45] Aug. 10, 1982

[54] PROJECTOR

[75] Inventor: Ulf J. E. Astero, Tumba, Sweden

[73] Assignee: Asthausbolagen HB Astero & Stockhaus, Tumba, Sweden

[21] Appl. No.: 200,500

[22] PCT Filed: Dec. 6, 1979

[86] PCT No.: PCT/SE79/00247

§ 371 Date: Jul. 23, 1980

§ 102(e) Date: Jul. 23, 1980

[87] PCT Pub. No.: WO80/01210

PCT Pub. Date: Jun. 12, 1980

[30] Foreign Application Priority Data

Dec. 6, 1978 [SE] Sweden ................................ 7812542

[51] Int. Cl.³ ............................................ G03B 21/08
[52] U.S. Cl. ..................................... 353/64; 353/101; 353/DIG. 4; 353/63
[58] Field of Search ........................................ 353/65–67, 353/63, 64, DIG. 3, DIG. 4, 101

[56] References Cited

U.S. PATENT DOCUMENTS 1,176,485   3/1916   Ott ........................................ 353/64
2,596,393   5/1952   Fitzgerald ............................. 353/66

FOREIGN PATENT DOCUMENTS 3544 of 1914   United Kingdom .................. 353/63

*Primary Examiner*—Harry N. Haroian
*Attorney, Agent, or Firm*—Burns, Doane, Swecker & Mathis

[57] ABSTRACT

A projector comprises a substantially horizontal table, a substantially centrally above the table arranged projection optics (2), a light source (3) which is located above the table and arranged to illuminate the table, a deflexion mirror (4) for substantially horizontal deflexion of a light radiating vertically upwardly from the table, and a light shaft (5) which at least partially screens off the area between the optics (2) and the table (1) from the surroundings and is characterized in that a covering (6a) is arranged to be laid out over the table surface in that the upwardly facing surface of the laid out covering is light-reflecting, while the table surface is light-absorbing preferably black and mat, alternatively that the upwardly facing surface of the laid out covering is light-absorbing while the table surface is arranged to emit light vertically upwardly.

10 Claims, 4 Drawing Figures

PROJECTOR

TECHNICAL FIELD

The invention refers to a projector comprising a substantially horizontal table, a projecting optics arranged substantially centrally above the table, a light source which is located above the table and arranged to illuminate the table, a deflexion mirror for substantially horizontal deflexion of light radiating vertically upwardly from the table, and a light shaft which at least partially screens off the area between the optics and the table from the environment.

BACKGROUND

Information activity is often conducted before small groups of e.g. around ten individuals or less. In connection with such information activity, projectors of so called over-head-type often come to use. Such a projector must i.a. due to the small size of the group, not be too complicated, heavy or expensive. Should moreover ready portability be a desire, the choice often falls on a so called 3 M projector. In order to project a picture material by means of such a projector, the material, however, must normally be transferred to so called large dias, which is a time-consuming and expensive measure even if the picture material should be of suitable large dia size, i.e. A4.

Problem of having to transfer the picture material into large dia or the like, has been noted and has partly been given a solution through e.g. Swedish Pat. No. 397 140, which thus constitutes an indication on the stand point of the technique. However, such an apparatus is i.a. not readily transportable and is not useful in connection with small groups.

OBJECT OF THE INVENTION

A primary object of the invention therefore is, starting from a simple large dia projector, to provide an easily transportable projector which with the purpose to be used before small groups and offer a moderate enlargement of the picture material, can project transparent picture material as well as non-transparent picture material without being structurally complicated. Another object of the inventive projector is to provide the possibility of an enlarged projection of small picture dia (e.g. 24×36 mm) or microfiche by means of the optics used in the projector.

Further objects of and purposes with the invention will appear in the following.

DISCLOSURE SUMMARY OF THE INVENTION

The inventive projector comprises a substantially horizontal table, projection optics arranged substantially centrally above the table, a light source which is located above the table and arranged to illuminate the table, a deflexion mirror for substantially horizontal deflexion of light radiating vertically upwardly from the table, and a light shaft which at least partially screens off the area between the optics and table from the environment, and is distinguished in that a covering is arranged layable over the surface of the table, and in that the upwardly facing surface of the laid out covering is light-reflecting, the surface of the table being light-absorbing, preferably mat and black, alternatively in that the upwardly facing surface of the laid out covering is light absorbing, the surface of the table being arranged to emit light vertically upwardly.

Thus, it has turned out that the projector design which is stated in the appended main claim, provides a simple switching between transparent and non-transparent picture material, and, furthermore, thanks to the light absorbing table covering for projection of a non-transparent picture material, offers a remarkably good and stray-light-free projected image.

In order to be easily handled, the covering can have the shape of a rollable foil, which is arranged rollable at a peripheral area of the table. The design can then be such that the foil is connected to a rotatably journaled and stationary roll up shaft at a margin area of the table, that the shaft is spring urged in order to permit rolling up of the foil on the shaft, and that the shaft preferably is provided with a roll up latch which is releasable by limited pulling of the foil in the roll out direction. The mirror may be pivotably or rotatably journaled in order to as desired permit deflection of the projection beam in substantially opposite generally horizontal directions. Hereby also left-handed operators can confortably use the projector, and moreover, at an education group comprising two subgroups facing each other, simply shift projection surface (behind or above respective subgroup) whereby the subgroups alternatingly can look at an image (or different images).

Especially at a projector which comprises a substantially horizontal table, projection optics arranged substantially centrally above the table, a light source which is located above the table and arranged to illuminate the table, a deflection mirror for substantially horizontal deflection of light radiating vertically upwardly from the table, and a light shaft which at least partially screens off the area between the optics and the surface from the environment, the design can be such, that the table is arranged to support a first picture material with the size of the order A4, in that the optics is arranged to provide partly a first focal plane at the table surface, partly a second focal plane at or in the optics, that the optics is arranged to provide from a second picture material with a substantially smaller size than the first picture material, for example dia pictures 24×36 mm or microfiches, a projected image of the same order of size as the one projected from the table. Hereby the projector suitably is designed such that the optics comprises a first objective arranged to define the first focal plane and a second objective which together with the first objective defines the second focal plane, and in that the second objective is arranged movable into and out of the projector beam. A holder for the second picture material of dia-type is suitably arranged movable into the projector beam in or adjacent the optics. The holder may be connected to the second objective. Hereby the projector can with advantage be used also for projected enlargement of dia pictures of small dimensions, for example small picture size (such as photo dia 24×36 mm) or microfiches (microfiche parts).

Especially a separate light source could be used with the second objective in order to enhance the luminance of the image projected from the small picture dia or the microfiche.

The inner substantial vertical surfaces of the light shaft could be made reflecting.

BRIEF DESCRIPTION OF THE DRAWINGS

In the following the invention will be closer described in connection with examples on embodiments with reference to the appended drawing wherein like members bear like reference numerals and wherein.

DETAILED DESCRIPTION OF THE PREFERRED EMBODIMENTS

Figure 1:
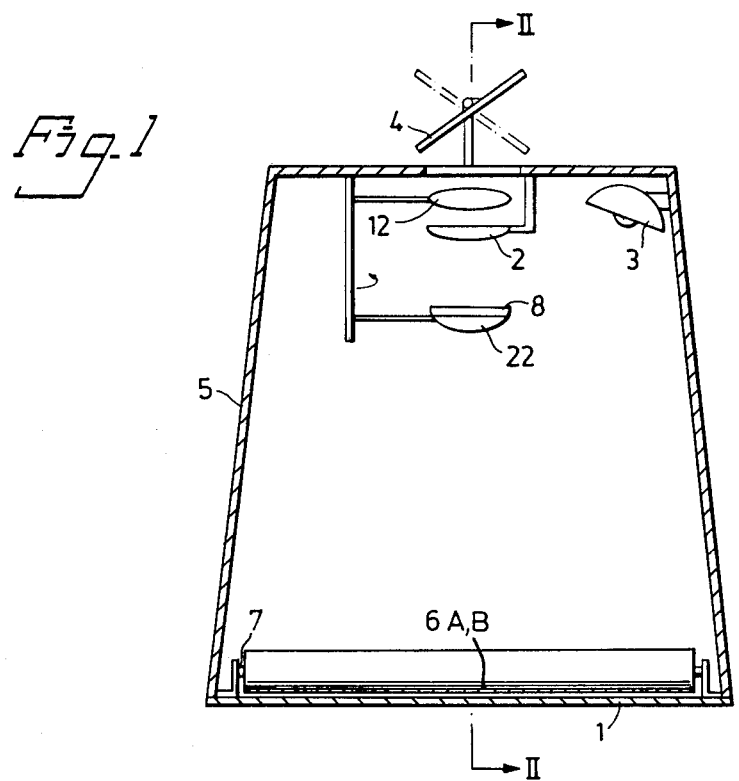
FIG. 1 is a schematic view of a vertical section through a first embodiment of a projector according to the invention.
Figure 2:
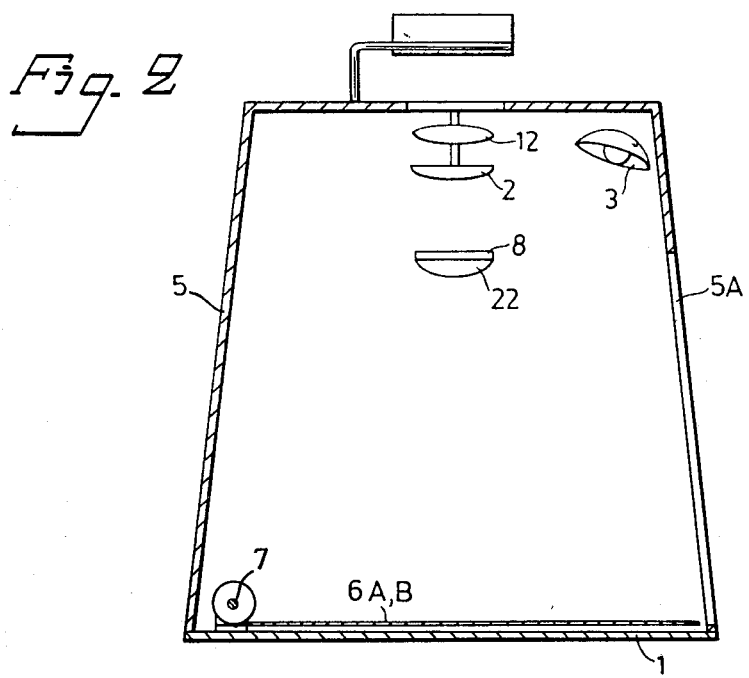
FIG. 2 is a vertical section taken along line II—II in FIG. 1.

FIGS. 1 and 2 generally illustrate a projector comprising a substantially horizontal table 1, a projection optics 2,12,22 arranged substantially centrally above the table, a light source 3 which is located above the table 1 and arranged to illuminate the table 1, a deflection mirror 4 for substantially horizontal deflection of light radiating vertically upwardly from the table, and a light shaft 5, which at least partially screens off the area between the optics and the table from the surroundings. At one peripheral area of the table 1 there is a stationary rolling up shaft 7. The shaft 7 is rotatably journaled and suitably consists of a conventional so called blind rod. A foil 6a, 6b is connected to the shaft or rod 7. The foil may be rolled up on the shaft, and the shaft is suitably spring urged in order to permit rolling up of the foil. Further, the shaft preferably comprises a rolling up latch which is releasable by limited pulling of the foil in the rolling out direction.

The light shaft 5, which can consist of a bellows or collapsible screening panels, has side apertures 5a through which a projector operator can insert a hand in order to change picture material and/or point at the picture material in the projector. The aperture 5a can be closeable.

According to a first embodiment the upper surface 6a of the foil can be light reflecting so that light from the light source 3 is reflected upwardly through the optic whereby the projector can project large size dia pictures which are laid on the foil. In this case the surface of the table 1 is designed lightabsorbing, and is preferably mat and black. When the foil is rolled up on the shaft 7, a non-transparent picture material could be laid on the surface of table 1 such that, when the light source 3 illuminates the picture material, an image thereof can be projected via the optics. It has turned out that the quality of the projected image becomes remarkably high when the table surface is light-absorbing. Alternatively the table surface can of course be arranged to emit light vertically upwardly; either by letting light from below shine through the surface of the table 1, or by letting the table surface be reflecting in order to reflect light from the light source 3, while the surface of the foil 6b is made light-absorbing, preferably black and mat.

Figure 3:
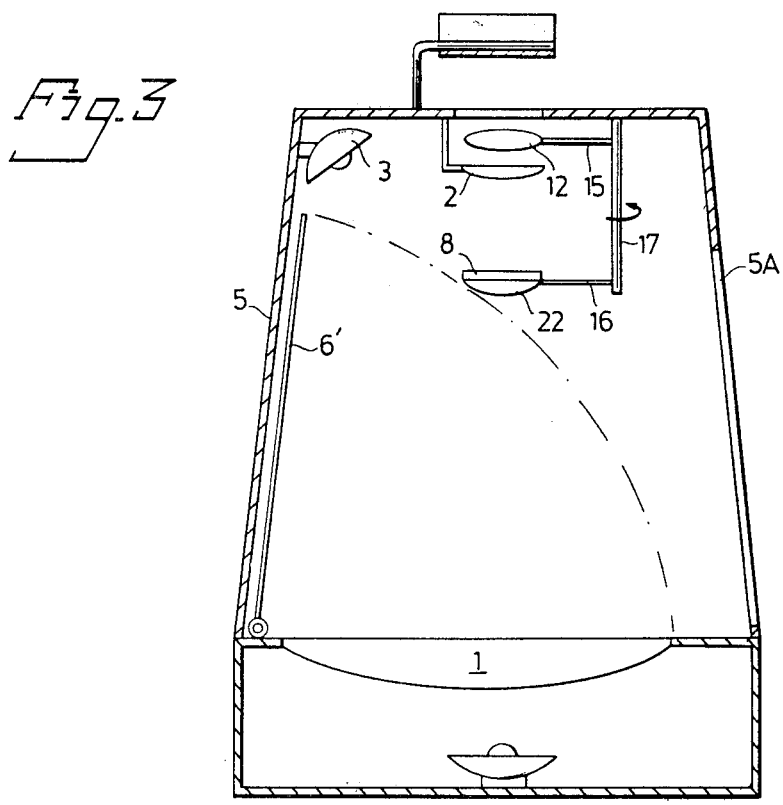
FIG. 3 is a section corresponding to FIG. 2 of a second embodiment of a projector according to the invention.

As appears from FIGS. 1 and 3, the mirror 4 is preferably designed such that it can be pivoted around a horizontal axis in order to permit switching of the projection direction as desired to two opposite directions in the horizontal plane.

As appears from FIG. 3, the covering can in an alternative embodiment be made in the shape of a plate 6', which is pivotably journaled at a peripheral area of the table.

In this case the light shaft is designed with a substantially right prismatic configuration so that the plate 6' partly can cover the surface of the table 1, partly can be folded up into a position close to a side wall of the shaft 5. The surface of the plate 6' and the table 1 respectively can be designed in analogy with the embodiment according to FIGS. 1 and 2, i.e. light-absorbing and light-emitting respectively or vice versa. In the embodiment according to FIG. 3 there is, however, illustrated an embodiment wherein the table surface is light-emitting thereby that a light source which has not been more closely indicated, is arranged below the surface of table 1 and wherein the table surface is constituted by a conventional lens, and, therefore, in FIG. 3, the surface of plate 6' should be made light-absorbing.

It has shown advantageous to let the inner walls of the light shaft 5 be made reflecting, at least when the light shaft is designed with substantially vertically oriented walls.

For projection of transparent or non-transparent picture material which is placed on the table 1 and on covering 6a,6b,6', a fixed optics 2 is used, which can be constituted by a simple positive lens.

Figure 4:
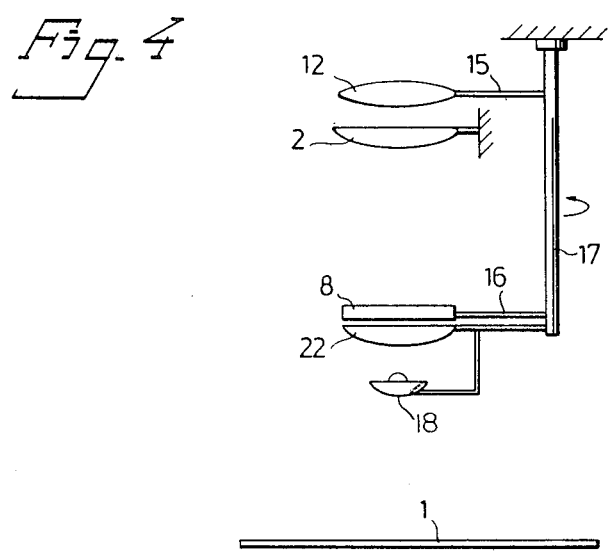
FIG. 4 is a view of an embodiment of a projector optics.

Should it be desired to obtain a projected enlargement of microfiche pictures or other dia pictures with a small size, the optics 2 can be combined with a part objective 12,22 as indicated in FIG. 1-3, a holder 8 for such picture material suitably being connected to the objective 12,22. Reference is now made to FIG. 4 which closer illustrates the projector optics. The optics preferably comprises a first objective 2, which is rigidly mounted at the upper portion of the projector below a projection beam aperture in the upper screen plate of the light shaft 5, below the mirror 4. A second objective which comprises two positive lenses 12 and 22 resp., is by means of pins 15 and 16 resp. connected to a vertical shaft 17. The lenses 12,22 are arranged pivotable into and out of the projector beam by means of the device 15-17. The pin 16 suitably also supports a holder 8 for microfiche or small picture dia. Further, a separate light source can be supported by the pin 16 or the shaft 17. It should, however, be noted that lens 22 is not absolutely necessary but could possibly be dispensed with, which is true also for the separate light source 18.

The second objective 12,22 serves in cooperation with the first objective 2, to provide a focal plane at the holder 8, thereby to provide a larger enlargement of this picture material than of a picture material arranged at the surface of table 1.

Preferably the composite objective 2 is arranged to provide on a projection screen a projected image of the picture material in holder 8 of the same size as a projected image of a picture material of e.g. A4-size, which is placed on table 1 and projected by means of the objective 2.

In a practical embodiment wherein the distance between table 1 and the first objective 2 of the projector is around 32 cm the following optics design has been shown useful for the above-mentioned double purpose.

The lens 2 is planoconvex with the flat surface facing upwardly, the convex surface having a radius of curvature of around 150 mm. The lens 12 is then a double convex lens with a substantially equal radius of curvature amounting to about 200 mm. The lens 22 is a planoconvex lens with the flat surface facing upwardly and with a radius of curvature of around 100 mm. The air gap between lenses 2 and 12 is about 10 mm and the air gap between lenses 2 and 22 is about 130 mm.

I claim:

1. A projector comprising a substantially horizontal table, projection optics arranged substantially centrally above the table, a light source which is located above the table and arranged to illuminate the table, a deflection mirror for substantially horizontal deflection of light radiating vertically upwardly from the table, and a light shaft which at least partly screens off the area between the optics and the table from the surroundings, a covering arranged to selectively lie upon the table surface, one of an upwardly facing surface of the laid-out covering and an upper surface of the table is light-absorbing while the other is arranged to emit light vertically upwardly.

2. The projector according to claim 1, wherein the covering has the shape of a rollable foil which is arranged to be rolled up at a peripheral area of the table.

3. The projector according to claim 2, wherein the foil is connected to a rotatably journaled and stationary roll up shaft at a peripheral area of the table, the shaft being spring urged in order to permit rolling up of the foil on the shaft, and the shaft being provided with a roll up latch which is releasable by limited roll out pulling of the foil.

4. The projector according to claim 1, wherein the mirror is pivotably journaled in order to deflect the projection beam in substantially opposite substantially horizontal directions.

5. The projector according to claim 1, wherein the table is arranged to support a first picture material with a size of the order A4, the optics being arranged to provide a first focal plane at the table surface and a second focal plane at or in the optics, the optics further being arranged to form a second picture material with a substantially smaller size than the first picture material, thereby to provide a projected image of the same order of size as the image projected from the table.

6. The projector according to claim 5, wherein the optics comprise a first objective arranged to define the first focal plane and a second objective which together with the first objective defines the second focal plane, and the second objective being arranged movable into an out of the projector beam.

7. The projector according to claim 5 or 6, further comprising a holder for the second picture material which holder is arranged movable into the projector beam in or at the optics.

8. The projector according to claim 7, wherein the holder is connected to the second objective.

9. The projector according to claim 8, further comprising a separate light source associated with the holder.

10. The projector according to claim 1, wherein inner substantially vertical surfaces of the light shaft are reflecting.

* * * * *